(12) United States Patent
Zhang et al.

(10) Patent No.: US 7,641,831 B2
(45) Date of Patent: Jan. 5, 2010

(54) METHOD FOR MANUFACTURING PLASTIC PRODUCTS

(75) Inventors: Bing Zhang, Shenzhen (CN); Deng He, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 293 days.

(21) Appl. No.: 11/616,834

(22) Filed: Dec. 27, 2006

(65) Prior Publication Data

US 2008/0026144 A1    Jan. 31, 2008

(30) Foreign Application Priority Data

Jul. 28, 2006    (CN) .................... 2006 1 0061852

(51) Int. Cl.
*B29C 37/02*    (2006.01)
*B29C 45/38*    (2006.01)
*B29C 45/40*    (2006.01)

(52) U.S. Cl. .................... 264/161; 264/156; 264/328.1; 264/328.9; 264/334

(58) Field of Classification Search ....................... None
See application file for complete search history.

(56) References Cited

U.S. PATENT DOCUMENTS 4,693,769 A * 9/1987 Fritz et al. .................. 156/73.1
5,391,332 A * 2/1995 Campbell et al. ............. 264/39
5,439,634 A * 8/1995 North .......................... 264/334

* cited by examiner

*Primary Examiner*—Monica A Huson
(74) *Attorney, Agent, or Firm*—Steven M. Reiss

(57) ABSTRACT

A method for manufacturing plastic product includes the steps of: forming a work piece (30) in an injection molding apparatus, the work piece (30) including at least an original product (34), a butt end (36), and gate (32), the gate (32) connecting a corresponding original product (34) with the butt end (36); precutting the gate (32) in a mold before the work piece (30) has completely cooled; removing the work piece (30) from the injection molding apparatus; separating each original product (34).

13 Claims, 3 Drawing Sheets

METHOD FOR MANUFACTURING PLASTIC PRODUCTS

BACKGROUND OF THE INVENTION

1. Field of the Invention

The present invention generally relates to methods for manufacturing plastic products, and more particularly, to a method for manufacturing small plastic products by means of an injection molding apparatus.

2. Description of Related Art

Nowadays, electronic devices such as mobile phones and digital cameras are widely used and bring convenience to our lives. In order to attract customer, producers of these products are increasingly concentrating on the appearance of the electronic devices. Since some small parts, e.g., covers for protecting camera lenses, infrared windows, keys, are generally mounted on an outside surface of an electronic device, these small parts might effect the appearance of the electronic device. These small parts are generally formed in an injection molding apparatus, and gate is formed at the same time. In order to achieve final product, gate must be removed. However, after the gate is removed defects will appear in the final product. Therefore, removal of gate has become an important factor affecting the quality of the product.

One conventional method of removing gate is cutting off the gate inside the mold. However, the product may be adhered to the mold in this method. In addition, the workers directly contact with the products during surface treatment so that the surfaces of the products may easily become scratched and polluted.

Another conventional method for removing gate is cutting off the gate outside the mold. The gate may be removed by means of hot cutting or cold cutting. If the products are thin and the gate is relatively thick compared to the product the product easily become damaged in hot cutting, and may easily form burrs during cold cutting.

What is needed, therefore, is a method for manufacturing plastic products which can overcome the above-described shortcomings.

SUMMARY OF THE INVENTION

In a preferred embodiment, a method for manufacturing plastic product includes the steps of: forming a work piece in an injection molding apparatus, the work piece including at least one original product, a butt end, and at least one gate, each gate connecting a corresponding original product with the butt end; precutting each gate in mold before the work piece is completely cooled; removing the work piece from the injection molding apparatus; separating each original product from the butt end.

Other advantages and novel features of preferred embodiments of the present method and its applications will become more apparent from the following detailed description when taken in conjunction with the accompanying drawings.

DETAILED DESCRIPTION OF THE INVENTION

In a first preferred embodiment, a method for manufacturing protective covers applied to electronic devices is disclosed according to the present invention. The protective covers are used to protect lenses mounted on electronic devices. The protective covers are generally square and roughly 0.75 mm thick. Each protective cover has a circular transparent portion at a central area thereof and an opaque portion around the transparent portion.

Figure 1:
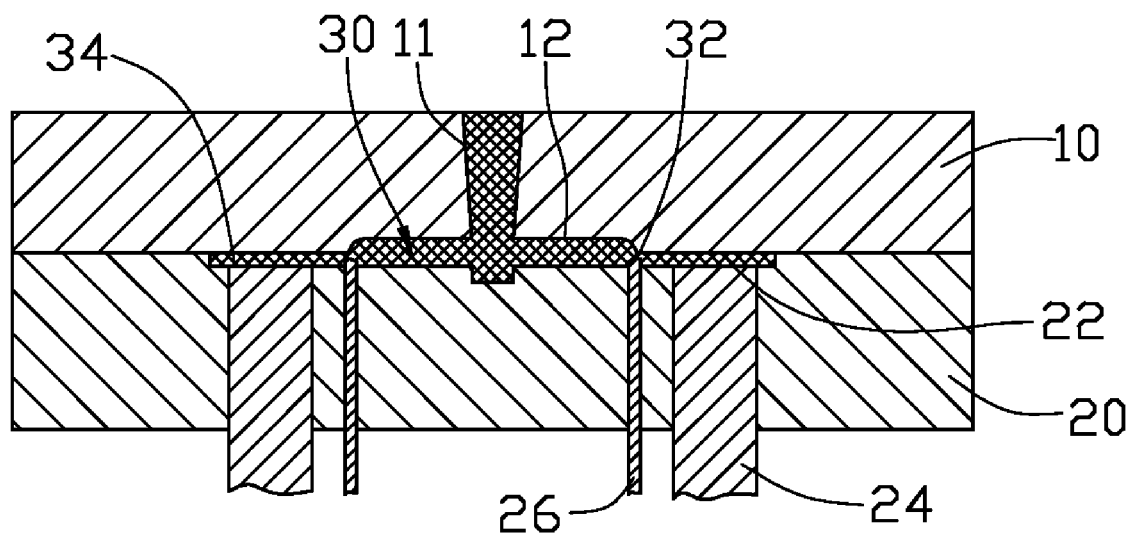
FIG. 1 is a schematic, cross-sectional view of a mold in accordance with a preferred method according to the present invention, showing a work piece formed in an injection molding apparatus.
Figure 2:
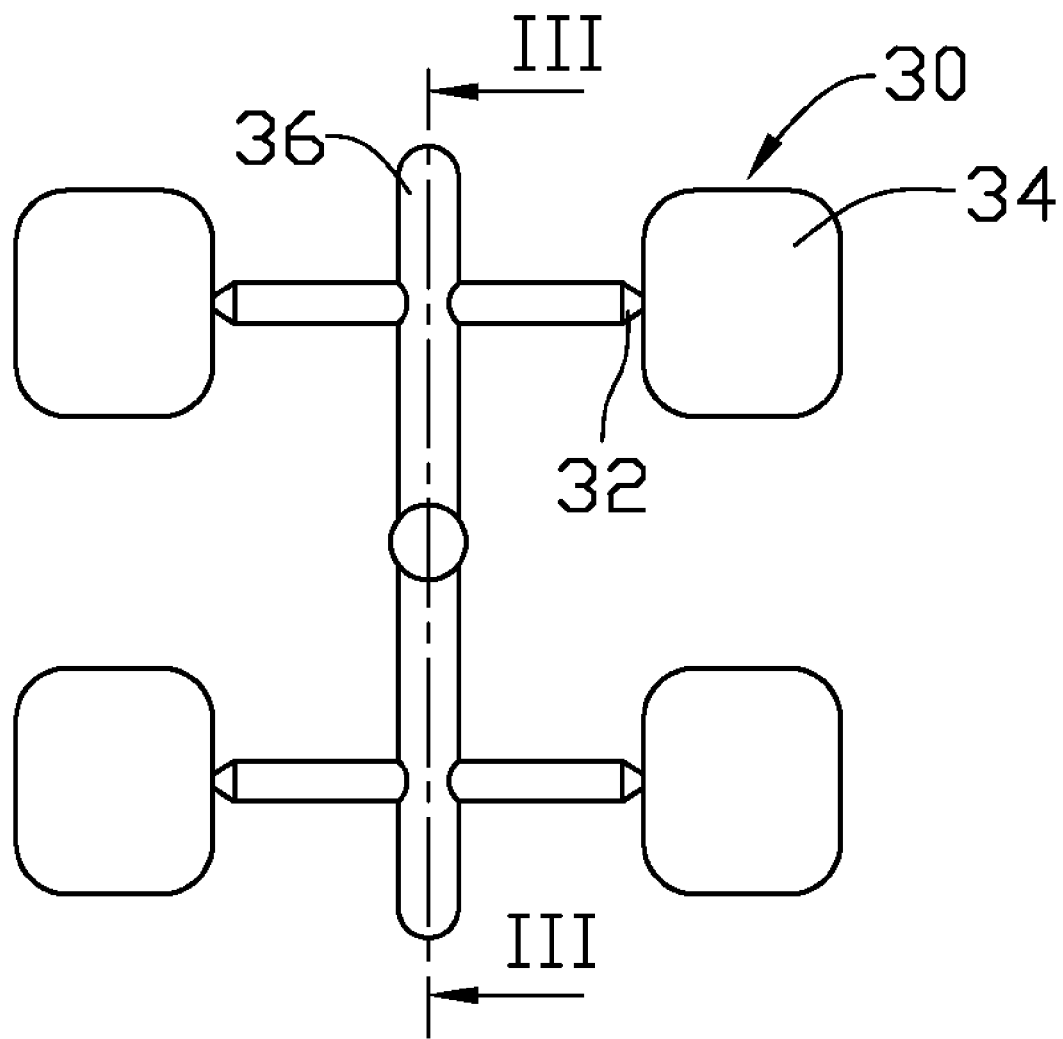
FIG. 2 is an isometric, top plan view of the work piece of FIG. 1, the work piece including four products, and a butt end.
Figure 3:
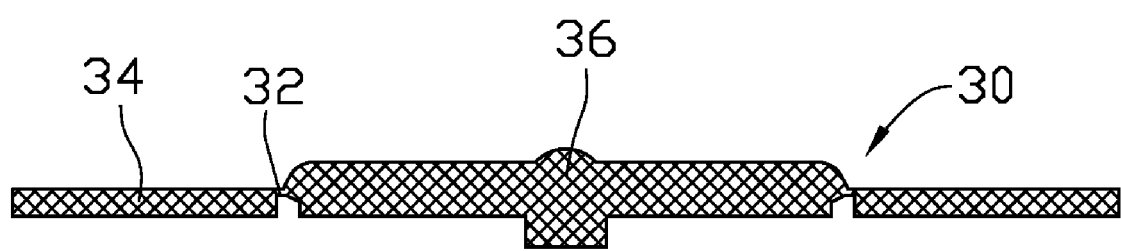
FIG. 3 is a cross-sectional view of the work piece in FIG. 2 along a line III-III.

Referring to FIG. 1, a work piece 30 is formed in an injection molding apparatus (not labeled).

The material of the work piece 30 is polymethylmethacrylate (PMMA). The injection molding apparatus includes an upper mold 10, a lower mold 20, and a precutting mechanism (not labeled). The upper mold 10 has a main runner 11, and four divaricate runners 12 extending from the main runner 11. The lower mold 20 has four mold cavities 22 defined therein. The shape of each mold cavity 22 corresponds to the protective cover in design. Each divaricate runner 12 communicates with a corresponding mold cavity 22. A plurality of ejector pins 24 are moveably positioned in the lower mold 20. The ejector pins 24 are used to push products out from the lower mold 20. The precutting mechanism includes four precutting pins 26. The precutting pins 26 are moveably disposed in the lower mold 20, and are positioned under the joining points of the corresponding cavities 22 and the divaricate runners 12.

The molten material is injected into the mold cavities 22 via the main runner 11 and the divaricate runners 12, a gate 32 is thus formed between a corresponding mold cavity 22 and a corresponding divaricate runner 12. The precutting pins 26 move upward and press the gate 32 before the material in mold is not completely cooled, and the material of the gate 32 is thus partly move away and the gate 32 becomes thinner. When the material in mold is completely cooled, a work piece 30 is formed. The work piece 30 includes four original lenses 34, four precut gates 32, and a butt end 36. The original lens 34 connects with the butt end 36 by means of the precut gates 32.

The thickness of the precut gates 32 can be controlled by the precutting mechanism. The thickness of the precut gates 32 depends on the moving distance of the precutting pins 26. In this preferred embodiment, the optimal leaving thickness of the gate 32 is 0.1 mm. In this case, on one hand, the gates 32 connect the original lens 34 with the butt end 36 so that the original lens 34 can be picked up by means of the butt end 36 thus avoiding the original lens 34 being scratched and polluted. On the other hand, the gate 32 becomes thinner is weakened as a result. Therefore the gate 32 can easily be broken without forming burr or gaps.

The work piece 30 is pushed out from the lower mold 20 by the ejector pins 24. A manipulator picks up the work piece 30 and lays it down on a reused carrier. The carrier has lots of cavities for receiving the original lens 34. The carrier is made of flexible material.

The carrier receiving the work piece 30 is transported to the printing room. The work piece 30 is picked up by hand or manipulator via the butt end 36, and laid down on a holder. One surface of each original lens 34 is printed using transfer printing, forming a circular transparent portion in a central area of the original lens 34 and an opaque portion around the transparent portion. The work piece 30 is dried by ultraviolet radiation in a drying apparatus. The work piece 30 is put on the carrier again. Touching of the lens 34 during operation is avoided, and of pollution and damage to the lens 34 is reduced as a result. Accordingly, the quality rate of the product is increased.

The work pieces 30 received in the carriers are transported to the assembly room. The gate 32 can be broken off by hand, in this way each lens 34 is separated from the butt end 36. The protective lens 34 can then be assembled with other parts and used in optical devices.

During the transportation of the work piece 30, the carriers protect the lens 34 instead of plastic bags used in the conventional method. In this case, the process of packing the work piece 30 with plastic bags is omitted. Accordingly, the production efficiency is increased, and the cost of manufacturing is reduced.

In a second preferred embodiment according to the present invention, the method is used for manufacturing keys. The material of the keys is made of acrylonitrile-butadiene-styrene (ABS). The surface treatment on the keys may involve many different methods such as crazing, spray painting, plating, and physical vapor deposition (PVD).

In a third preferred embodiment according to the present invention, the method is used for manufacturing infrared windows. The infrared windows can be made of polycarbonate (PC). In this case, the surface treatment is omitted, in which the work pieces formed in the mold are directly transported to the assembly room.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing plastic product, the method comprising the steps of:
    (1) forming a work piece in an injection molding apparatus, the work piece including at least one original product, a butt end, and a gate, the gate connecting the at least one original product and the butt end;
    (2) precutting each gate in the injection molding apparatus before the work piece has completely cooled, the gate becoming thinner but continuing connecting the at least one original product and the butt end;
    (3) removing the work piece from the injection molding apparatus; and,
    (4) separating each original product from the butt end.

2. The method as claimed in claim 1, wherein the gate is 0.1 mm thick after precutting.

3. The method as claimed in claim 1, wherein the gate is broken off by hand in step (4).

4. The method as claimed in claim 1, wherein the injection molding apparatus comprises an upper mold, a lower mold, and a precutting mechanism, the precutting mechanism including at least one precutting pin, each precutting pin being moveable relative to the lower mold.

5. The method as claimed in claim 4, wherein the thickness of the precut gate depends on the movement distance of the precutting pins.

6. The method as claimed in claim 1, further comprising a transporting step between step (3) and step (4), wherein the work piece is received in a carrier during the transporting step.

7. The method as claimed in claim 6, wherein the carrier is made of flexible material.

8. The method as claimed in claim 1, further comprising a step of surface treatment on each original product between step (3) and step (4), wherein the work piece has a surface treatment before the gate is separated from the butt end.

9. The method as claimed in claim 8, wherein the surface treatment comprises a transfer printing.

10. The method as claimed in claim 8, wherein the surface treatment comprises crazing.

11. The method as claimed in claim 8, wherein the surface treatment comprises spray painting.

12. The method as claimed in claim 8, wherein the surface treatment comprises plating.

13. The method as claimed in claim 12, wherein the surface treatment further comprises physical vapor deposition after plating.

* * * * *

UNITED STATES PATENT AND TRADEMARK OFFICE
CERTIFICATE OF CORRECTION

PATENT NO.        : 7,641,831 B2                                              Page 1 of 1
APPLICATION NO. : 11/616834
DATED             : January 5, 2010
INVENTOR(S)       : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this

Sixteenth Day of November, 2010

David J. Kappos
*Director of the United States Patent and Trademark Office*